United States Patent [19]
Fiala et al.

[11] 4,179,901
[45] Dec. 25, 1979

[54] MOTOR-DRIVEN HEAT PUMP

[75] Inventors: Ernst Fiala; Peter Hofbauer; Harald Loeck; Edgard Grundmann, all of Wolfsburg, Fed. Rep. of Germany; Herbert Heitland, Sao Paulo, Brazil

[73] Assignee: Volkswagenwerk AG, Wolfsburg, Fed. Rep. of Germany

[21] Appl. No.: 917,387

[22] Filed: Jun. 20, 1978

[30] Foreign Application Priority Data

Jun. 23, 1977 [DE] Fed. Rep. of Germany ....... 2728239

[51] Int. Cl.² .................. F25B 41/00; F25B 27/02; F25B 47/00
[52] U.S. Cl. .............................. 62/238; 62/196 R; 62/277
[58] Field of Search ........... 62/79, 238 E, 277, 196 R, 62/238 R

[56] References Cited
U.S. PATENT DOCUMENTS

| | | | |
|---|---|---|---|
| 2,150,224 | 3/1939 | Hull | 62/238 E |
| 2,375,157 | 5/1945 | Wilkes et al. | 62/238 E |
| 2,698,524 | 1/1955 | Rygard | 62/428 X |
| 2,720,083 | 10/1955 | Garland | 62/238 E |
| 3,926,008 | 12/1975 | Webber | 62/238 E |
| 3,959,986 | 6/1976 | Ledermann | 62/238 E |

*Primary Examiner*—Lloyd L. King
*Attorney, Agent, or Firm*—Spencer & Kaye

[57] ABSTRACT

A motor-driven heat pump arrangement includes a motor; a refrigerant circuit; a motor-driven compressor, a condenser and an evaporator connected in the refrigerant circuit; a heating medium circuit having a heating medium output line and a heating medium return line; a heat exchanger transferring waste heat from the motor to the heating medium in the heating medium circuit; a device for delivering evaporation heat from the heating medium to the refrigerant at a location situated upstream of the compressor as viewed in the direction of the refrigerant flow in the refrigerant circuit; a conduit connected to the device for passing the heating medium therethrough; and a switching arrangement for operatively connecting the conduit to or disconnecting it from the heating medium return line.

5 Claims, 3 Drawing Figures

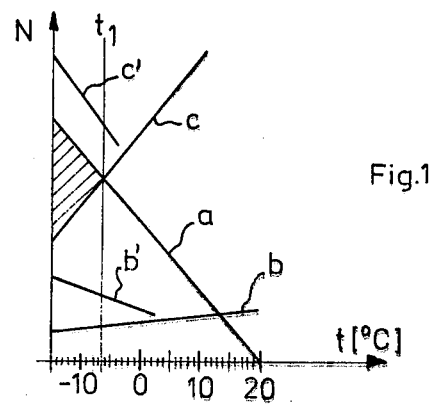
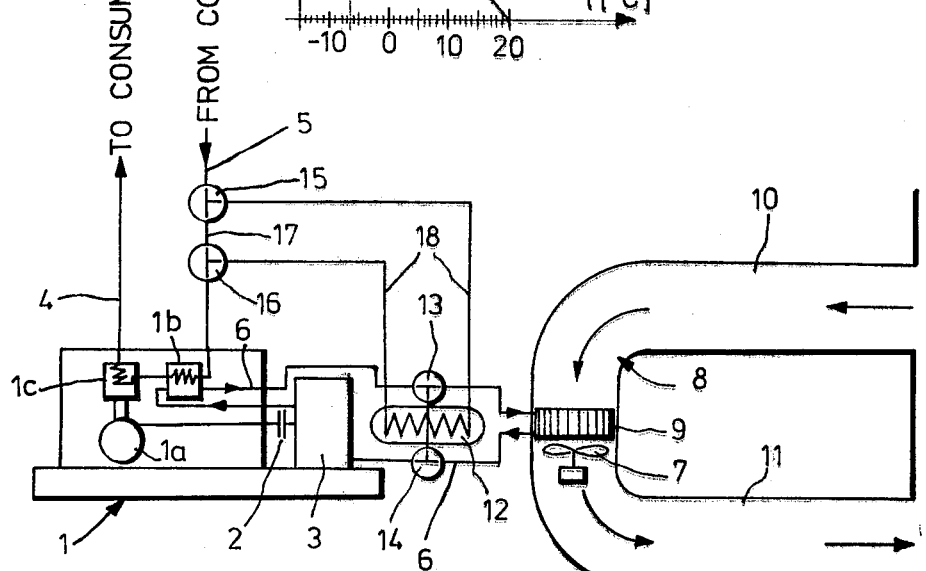
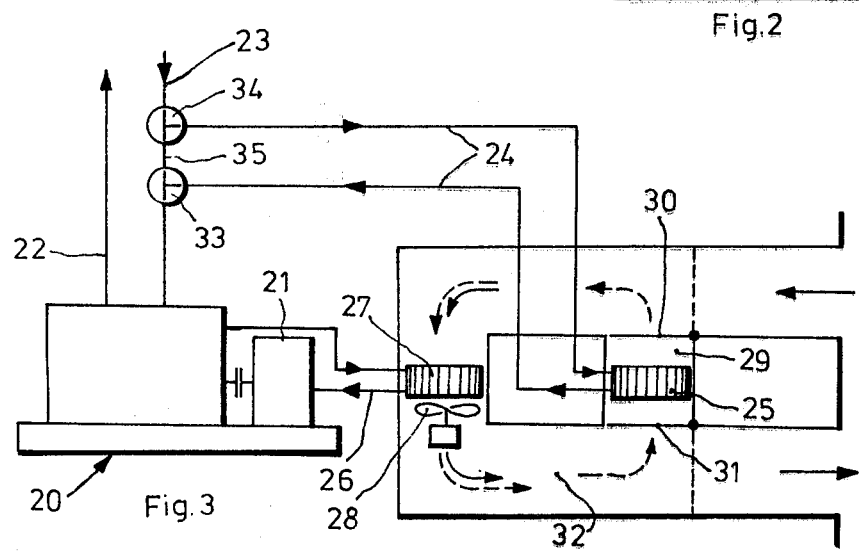

MOTOR-DRIVEN HEAT PUMP

BRIEF DESCRIPTION OF THE DRAWINGS

FIG. 1 is a diagram generally illustrating the output of a heat pump and the heat requirement of a building served by the heat pump as a function of the external temperatures.

FIG. 2 is a schematic view of a first preferred embodiment of the invention.

FIG. 3 is a schematic view of a second preferred embodiment of the invention.

BACKGROUND OF THE INVENTION

This invention relates to a motor-driven heat pump arrangement including a motor-driven compressor for a refrigerant contained in a refrigerant circuit which is connected to an evaporator for drawing heat from an external medium, particularly external air of changing temperature. The heat pump arrangement further has a heating medium output line which contains at least one heat exchanger supplied with the waste heat of the motor and a heating medium return line which is arranged upstream of a condenser for the refrigerant, as viewed in the flow direction of the heating medium. Conventionally, an internal combustion engine is used as the drive motor as disclosed, for example, in German Laid-Open Application (Offenlegungsschrift) No. 2,418,196, since its substantial waste heat (derived from the cooling water or cooling air as well as the exhaust gases) may be utilized readily and with a high degree of efficiency.

The use of motor-driven heat pump arrangements and the utilization of the waste heat of the motor (engine) involves the basic disadvantage in that in case of a significant drop of the temperature of the external medium which, as a rule, is outer air, the available waste heat of the motor also drops significantly. Since the waste heat quantities generated by the motor are dependent from the motor load which, in turn, is determined by the power requirement of the compressor for the refrigerant, and the volumetric refrigerating output of the compressor which is dependent from the mass flow of the delivered refrigerant also decreases as the temperature of the external medium drops, the heat pump arrangement of the above-outlined type has the undesirable characteristics that as the temperature of the external medium (outer air) is reduced, thus, precisely when the heat requirement of the building (or the like) to be heated by the heat pump arrangement increases, delivers, because of the drop in the available waste heat of the motor, a smaller total heat output than at higher temperatures of the external medium.

The diagram in FIG. 1 illustrates the above-discussed conditions. The abscissa of the diagram measures the temperature t which, as a rule, is the external air temperature, while the ordinate designates the output N of the heat pump, as well as the power demand of the compressor and the heat requirement of the building to be heated. The rpm of the compressor and thus that of the motor (engine) is assumed to be constant. As the temperature decreases, the heat requirement of the building increases relatively steeply as indicated by the curve a. Thus, an increase in the total heat delivery of the heat pump is required as well. Since, however, the compressor input drops as the temperature falls as it was explained above and as it is illustrated by the curve b, there is obtained a curve c representing the total heat delivery available from the heat pump. This heat delivery—contrary to the tendency of the curve a representing the heat requirement—drops relatively sharply as the temperature falls. Below a temperature value $t_1$ which represents the point of intersection of the curves a and c, there is obtained a differential heat requirement which is represented in the diagram by the shaded area and which cannot be supplied by the heat pump arrangement, so that an additional heating apparatus has to be provided.

SUMMARY OF THE INVENTION

It is an object of the invention to provide an improved heat pump arrangement of the above-outlined type in which the decreasing tendency of the compressor input (illustrated by the curve b in FIG. 1) and thus the decreasing tendency of the total heat output (represented by the curve c) delivered by the heat pump arrangement is at least in the range of low external air temperatures varied in such a manner that the total heat output available from the heat pump arrangement also covers the heat requirement prevailing at such low air temperatures.

It is noted that in the context of this invention, the external temperature is not limited to the temperature of air; it may be the temperature of a water body or a flowing medium which has assumed ground temperatures. It is thus to be understood that the terms "outer temperature" or "external air" used for simplifying the description are not meant to limit the invention to a strict interpretation of these terms.

The above objects and others to become apparent as the specification progresses, are accomplished by the invention, according to which, briefly stated, the motor-driven heat pump arrangement includes a motor; a refrigerant circuit; a motor-driven compressor, a condensor and an evaporator connected in the refrigerant circuit; a heating medium circuit having a heating medium output line and a heating medium return line; a heat exchanger transferring waste heat from the motor to the heating medium in the heating medium circuit; a device for delivering evaporation heat from the heating medium to the refrigerant at a location situated upstream of the compressor as viewed in the direction of the refrigerant flow in the refrigerant circuit; a conduit connected to the device for passing the heating medium therethrough; and a switching arrangement for operatively connecting the conduit to or disconnecting it from the heating medium return line.

Thus, an essential aspect of the invention is to recover for the refrigerant during low external temperatures, the evaporation heat from the heating medium return line (thus, as a rule, heating water). By means of such a temperature increase of the evaporated refrigerant, the mass flow of the delivered refrigerant and thus the volumetric refrigerating output and the power demanded by the compressor from the engine are increased. As a result, the waste heat delivered by the engine increases and consequently, the invention leads to a change of the curves b and c of FIG. 1 into curves b' and c' which have a tendency to increase in case of decreasing temperatures.

According to a first basic embodiment of the invention, the device which supplies evaporation heat from the heating medium to the refrigerant is an additional evaporator which can be coupled to the refrigerant circuit while at the same time the first-named evaporator is disconnected and thus the heat removal from the external medium is temporarily discontinued. The second evaporator thus does not transfer heat from the external air to the refrigerant as it is done by the first-named evaporator, but transfers heat from the returning heating medium (heating water), so that it replaces the first-named evaporator only in its function, but not as far as its location is concerned.

According to a second basic embodiment of the invention, the device which supplies evaporation heat from the heating medium to the refrigerant is a heat exchanger which is contained in a heat carrier circuit which includes the evaporator and which is formed by disconnecting the inlet and the outlet for the external air. Thus, according to the second basic embodiment, the first-named evaporator remains in operation, although, as in the first basic embodiment, the inlet and outlet for the external air are again disconnected from the apparatus. Thus, in the second embodiment, the heat exchanger transfers heat to the heat carrier in the heat carrier circuit, that is, the heat exchanger heats recirculated air admitted to the evaporator and thus establishes conditions which characterize higher external temperatures. The switching-over from the normal operation with heat removal from the external air to an operation under low external temperatures, that is, the switching-over to an operation with the heat exchanger may be achieved technically in a simple manner by providing that the inlet and the outlet for the external air is constituted by a U-shaped duct, at the base of which there is arranged the evaporator. The free ends of the duct legs may be connected to one another with the intermediary of a coupling duct portion by pivoting appropriate gates. The duct portion accommodates the heat exchanger.

The above-outlined second basic embodiment further offers the possibility of defrosting the evaporator without interrupting the heat pump operation and without the necessity of using an additional evaporator. For this purpose, the heat exchanger is so dimensioned that its supply of heat quantity to the heat carrier circuit is greater than the heat quantity which the evaporator, in its frosted condition, transmits to the refrigerant.

DESCRIPTION OF THE PREFERRED EMBODIMENTS

Two preferred embodiments will be described in connection with FIGS. 2 and 3, respectively.

Turning to FIG. 2, there is shown a conventional heat pump aggregate generally indicated at 1. It has a motor 1a such as an internal combustion engine and a compressor 3 driven by the motor by means of a clutch 2. The compressor 3 is connected in a refrigerant circuit 6 for compressing refrigerant therein and driving it to a condenser 1b also forming part of the aggregate 1. In the refrigerant circuit 6 there is further connected an evaporator 9 which receives refrigerant from the condenser 1b. A heating medium circuit serving a consumer (such as a building to be heated) has a heating medium (such as heating water) output line 4 and a heating medium return line 5. The heating medium circuit passes through the condenser 1b and then through a heat exchanger 1c which is supplied with waste water from the motor 1a and which is also a part of the aggregate 1. The heating medium enters the condenser 1b through the return line 5 and leaves the heat exchanger 1c through the output line 4. The evaporator 9 is disposed in an air duct 8 which further accommodates a fan 7 for driving external air in the duct 8 through the evaporator 9. The duct 8 has an inlet part 10 (located upstream of the evaporator 9) and an output part 11 (located downstream of the evaporator 9).

In case the external temperatures are above the value $t_1$ as illustrated in FIG. 1, the system shown in FIG. 2 operates in a conventional manner with the components described to this point. The heating water is heated by means of a conventional heat exchanger 1c with the utilization of the waste heat (derived from the cooling water and the exhaust gases) of the engine 1a.

According to the invention, the heat pump arrangement comprises as an essential component, an additional evaporator 12 which is operatively connectable to the refrigerant circuit 6 by switch valves 13 and 14 and to the heating medium return line 5 by switch valves 15 and 16. During conventional operation the additional evaporator 12 is disconnected from the heat pump arrangement by an appropriate setting of the switch values 13–16. Thus, during the conventional operation, the heating water in the return line 5 passes through the valve 15, the bypass 17 and the valve 16 directly into the heat pump aggregate 1 while valves 13 and 14 connect the evaporator 9 to the refrigerant circuit 6.

As soon as the external temperature drops below a predetermined value, such as below the value $t_1$ of FIG. 1, the system according to the invention becomes effective by switching the valves 13–16 either manually or by an automatic, temperature-responsive control. Thus, in the effective (operative) phase the additional evaporator 12 is operatively connected to the refrigerant circuit 6 by switching the valves 13 and 14 which simultaneously disconnect the evaporator 9 from the refrigerant circuit 6. At the same time, by switching the valves 15 and 16, the bypass member 17 is shut off and a conduit 18 which passes through the additional evaporator 12 is connected in series with the heating water return line 5 to now form a part thereof. As a result, it is now not the external air, but the returning heating water which supplies the evaporation heat for the refrigerant in the circuit 6.

Turning now to the second embodiment illustrated in FIG. 3, there is again provided a heat pump aggregate designated here generally at 20 which comprises the engine, the compressor 21 as well as the heat exchanger and the condenser as it was described in connection with FIG. 2. The heating water output line is designated at 22, while the heating water return line is designated at 23. In contradistinction to the first-described embodiment, where an additional evaporator 12 was provided, the embodiment according to FIG. 3 has, as an essential component, an additional heat exchanger 25 which is operatively connectable to the heating medium return line 23 by switch valves 33 and 34. An evaporator 27 which, in this embodiment, is a continuously effective (thus non-disconnectable) component of the refrigerant circuit 26 and a continuously effective fan 28 are disposed in a U-shaped duct 32. The heat exchanger 25 is disposed in a duct 29 situated between the legs of the U-duct 32. Depending upon the pivotal position of gates 30 and 31, the ends of the U-duct 32 are either connected to one another with the intermediary of the duct 29 or are respectively coupled to an inlet and an outlet for external air.

Considering first the operation of the heat pump arrangement of the embodiment according to FIG. 3 at relatively high external temperatures, the gates 30 and 31 are in their full-line position and thus the external air flows along the full-line arrows in the duct 32. Thus, in this operational phase, the heat exchanger 25 is inoperative and only the evaporator 27 is effective.

At lower external temperatures, thus, for example, at temperatures which correspond to or are lower than the value $t_1$ in FIG. 1, the gates 30 and 31 are moved into their dash-dotted position either manually or by means of an automatic temperature-responsive setting member. Thus, the inlet and the outlet for the external air are shut off and the ducts 32 and 29 now constitute a closed air circuit in which the air, as a heat carrier, flows along the arrows shown in dashed lines driven by the fan 28. The circulating air thus carries the heat which it takes from the heat exchanger 25 to the evaporator 27 and thus to the refrigerant in the refrigerant circuit 26.

Expediently, in the heating water return line 23, valves 33 and 34 are provided which are now set in such a manner that the bypass 35 is shut off and thus the heating water returning in the conduit 23 is routed through the heat exchanger 25 via the conduits 24.

With either embodiment according to the invention, there is achieved an increase of the temperature of the refrigerant admitted to the compressor and thus, as a final result, there is achieved an increase of the output required of the engine. In both embodiments the device (12 in FIG. 2 and 25 in FIG. 3) which withdraws heat from the heating water just before it returns to the aggregate 1, delivers the withdrawn heat to the refrigerant at a location which is upstream of the compressor as viewed in the direction of refrigerant flow in the refrigerant circuit.

The embodiment according to FIG. 3 further offers the possibility of eliminating frosting of the evaporator 27 (which takes place at lower external temperatures) without interrupting the operation of the heat pump arrangement. For this purpose, the heat exchanger 25 is so dimensioned that the heat quantity it delivers to the evaporator 27 is greater than the heat quantity which the evaporator 27, in its frosted condition, delivers to the refrigerant.

It is to be understood that the above description of the present invention is susceptible to various modifications, changes and adaptations, and the same are intended to be comprehended within the meaning and range of equivalents of the appended claims.

What is claimed is:

1. In a motor-driven heat pump arrangement including a motor; a refrigerant circuit; a compressor driven by the motor and connected in the refrigerant circuit; a condenser connected in the refrigerant circuit; an evaporator connected in the refrigerant circuit for withdrawing heat from an external, ambient medium; a heating medium circuit having a heating medium output line and a heating medium return line; a heat exchanger connected to the motor and to the heating medium circuit for transferring waste heat from the motor to the heating medium in the heating medium circuit; the heating medium circuit being connected to the condenser for transferring heat from the refrigerant to the heating medium; the condenser being arranged downstream of the heating medium return line and the heat exchanger being arranged upstream of the heating medium output line as viewed in the direction of flow of the heating medium; the improvement comprising
   (a) a device for delivering evaporating heat from the heating medium to the refrigerant at a location situated upstream of said compressor as viewed in the direction of refrigerant flow;
   (b) conduit means connected to said device for passing the heating medium therethrough; and
   (c) switching means for operatively connecting said conduit means to or disconnecting it from said heating medium return line.

2. A motor-driven heat pump arrangement as defined in claim 1, wherein said evaporator is a first evaporator and said switching means is a first switching means and wherein said device is a second evaporator; further comprising second switching means having a first switching position in which said first evaporator is connected in said refrigerant circuit and said second evaporator is disconnected therefrom; said second switching means having a second switching position in which said second evaporator is connected in said refrigerant circuit and said first evaporator is disconnected therefrom.

3. A motor-driven heat pump arrangement as defined in claim 1, wherein said heat exchanger is a first heat exchanger and said switching means is a first switching means and wherein said device is a second heat exchanger; further comprising duct means defining a path for a heat carrying medium; said duct means having an inlet and an outlet for the external, ambient medium; said evaporator and said second heat exchanger being situated in said duct means; and second switching means having a first switching position in which said inlet and said outlet are open for allowing the external, ambient medium to pass through said evaporator; said second switching means having a second switching position in which said inlet and said outlet are closed for transforming said duct means into a closed circuit for guiding the heat carrying medium in a closed path through said second heat exchanger and said evaporator.

4. A motor-driven heat pump arrangement as defined in claim 3, wherein said duct means comprises a U-shaped duct portion having two leg parts and an interconnecting base part; said evaporator being situated in said base part; said duct means further comprising a connecting duct portion situated between said leg parts of said U-shaped duct portion and accommodating said second heat exchanger; said second switching means comprising gates pivotally supported at said duct means; in said first switching position said gates block said connecting duct portion from said U-shaped duct portion and maintain communication of said inlet and said outlet with the respective leg parts of said U-shaped duct portion and in said second switching position said gates block said inlet and said outlet from said U-shaped duct portion and maintain communication between ends of said leg parts through said connecting duct portion.

5. A motor-driven heat pump arrangement as defined in claim 3, wherein said second heat exchanger has dimensions to effect therefrom a transfer of a greater heat quantity to said closed circuit for the heat carrying medium than the heat quantity transferred from said evaporator to said refrigerant circuit in a frosted condition of said evaporator.

* * * * *